(12) United States Patent
Shikii et al.

(10) Patent No.: US 6,456,415 B1
(45) Date of Patent: Sep. 24, 2002

(54) OPTICAL SCANNER

(75) Inventors: Shinichi Shikii; Yasuhiro Kawai, both of Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/585,293

(22) Filed: Jun. 2, 2000

(30) Foreign Application Priority Data

Jun. 2, 1999 (JP) .......................................... 11-154512

(51) Int. Cl.[7] .............................................. G02B 26/08
(52) U.S. Cl. ........................ 359/205; 359/834; 359/216
(58) Field of Search ................................ 359/196, 197, 359/205, 206, 207, 208, 834, 212, 831, 833, 836, 837, 216

(56) References Cited

U.S. PATENT DOCUMENTS

| | | | | |
|---|---|---|---|---|
| 3,879,105 A | * | 4/1975 | Broche et al. ................. | 350/51 |
| 4,509,819 A | * | 4/1985 | Sherman et al. ............ | 359/205 |
| 4,598,980 A | * | 7/1986 | Doi et al. .................... | 350/445 |
| 5,742,068 A | * | 4/1998 | Dybdahl et al. ............. | 250/236 |
| 5,784,094 A | * | 7/1998 | Ota et al. ..................... | 347/243 |

FOREIGN PATENT DOCUMENTS

| JP | 3-220517 | 9/1991 | ........... G02B/26/10 |
|---|---|---|---|
| JP | 11084291 A | * 3/1999 | ........... G02B/26/10 |

* cited by examiner

*Primary Examiner*—Cassandra Spyrou
*Assistant Examiner*—Euncha Cherry
(74) *Attorney, Agent, or Firm*—Sughrue Mion, PLLC

(57) ABSTRACT

A light beam deflected by a polygon mirror (20) is incident substantially perpendicularly on a trapezoidal reflecting prism (33) having an incidence surface (33a) and two reflection surfaces (33b, 33c). Then, the light beam incident on the reflecting prism (33) is totally reflected at the first reflection surface (33b) toward the second reflection surface (33c). Next, the totally reflected light beam is totally reflected at the second reflection surface (33c) toward the incidence surface (33a) and is emitted from the incidence surface (33a) in the opposite direction from the incident direction. The emitted light beam passes through a cylindrical lens (34) and is reflected and directed toward a scan surface (40) by a cylindrical mirror (35). The reflected light beam forms a scanning spot-on the scan surface (40).

17 Claims, 4 Drawing Sheets

OPTICAL SCANNER

BACKGROUND OF THE INVENTION

1. Field of the Invention

This invention relates generally to an optical scanner that causes a beam of light to scan across a surface at uniform velocity, and more particularly to a dust countermeasure in an optical scanner having a structure that turns back the optical path of a light beam deflected by an optical deflector such as a rotating polygon mirror.

2. Description of the Related Art

Hitherto, optical scanners to perform optical scan with a light beam deflected by a deflector using a polygon mirror (rotating polygon mirror) are well known. This type of optical scanner is employed in recorders or readers that use a laser beam, etc. The general construction consists of a light source for emitting a light beam, a polygon mirror for deflecting the light beam emitted from the light source, and a scanning optics system (imaging optics system) employing an fθ lens, a correction lens, etc. The fθ lens is used for focusing the deflected light beam on a predetermined surface and causing the focused light beam to scan on the surface at uniform velocity, and the correction lens is used to correct the positional error (pitch unevenness) in the scanning line due to the surface tilt of the deflector.

If the fθ lens, etc., of the scanning optics system are disposed simply in a row on the optical axis of the light beam deflected by the polygon mirror, the size of the scanning optics system will increase in this optical-axis direction.

Hence, for example, as shown in FIG. 4, the required optical path length has been ensured and the scanning optics system reduced in size, by (1) inserting two reflecting mirrors 132, 133 into the scanning optics system; (2) obliquely reflecting a light beam L1, deflected by a polygon mirror 120 and passed through an fθ lens 131, by the first reflecting mirror 132; and (3) further reflecting the reflected light beam by the second reflecting mirror 133 so that the optical path of the reflected light beam L2 crosses the optical path of the light beam L1 incident on the first reflecting mirror 132 (e.g., Japanese Unexamined Patent Publication No. 3(1991)-220517).

However, as shown in FIG. 4, one (in this example, the first reflecting mirror 132) of the two reflecting mirrors 132, 133 must be directed toward a ceiling side in order to reflect the incident light beam L1 and cross the reflected light beam L2 with the incident light beam L1, and dust is liable to accumulate on the surface of reflection of the reflecting mirror facing the ceiling side. As a consequence, the problem of image unevenness, signal-to-noise (S/N) ratio degradation, etc., will arise in readers, etc., which use an optical scanner having such structure.

SUMMARY OF THE INVENTION

The present invention has been made in view of the aforementioned problem. Accordingly, it is the primary object of the present invention to provide an optical scanner having structure which turns back the optical path of a light beam, while solving the problem of dust adhesion.

In the optical scanner of the present invention, a reflecting prism, which serves as a means of turning back a light beam emitted from a deflector, is inserted between a deflector and a scan surface. The reflecting prism reflects the light beam, reflected at the reflector, in the opposite direction from the incident direction of the light beam, and the reflecting mirror reflects the light beam reflected by the prism toward the scan surface. With this arrangement, the required optical path length is ensured and the problem of dust adhering to the reflection surface facing a ceiling side is solved.

More particularly, the optical scanner of the present invention comprises: a light source for emitting a light beam; a deflector for deflecting the light beam in a predetermined direction; and a scanning optics system for causing the deflected light beam to scan on a predetermined surface at a uniform velocity. The scanning optics system includes a reflecting prism having at least two reflection surfaces which reflect the light beam, incident from the deflector, in the opposite direction from the incident direction of the light beam.

The words "opposite direction" mean that the optical axis of the light beam emitted from the reflecting prism has at least the component of the opposite direction from the optical axis of the light beam incident on the reflecting prism and do not always mean that the optical axis of the emitted light beam is in the exact opposite direction from the optical axis of the incident light beam.

The "reflecting prism" may be of any type, as long as it has at least two reflection surfaces so that an incident light beam is totally reflected at the reflection surfaces and emitted in the opposite direction from the direction of the incident light beam. For example, the reflecting prism may employ a triangular prism, a trapezoidal prism, etc., which have an incidence surface on which a deflected light beam is incident, a first reflection surface to reflect the light beam passed through the incidence surface, and a second reflection surface to reflect the light beam reflected by the first reflection surface toward the incidence surface.

The optical scanner of the present invention may further include a dust-proof cover for protecting at least one of at least two reflection surfaces which is disposed on a ceiling side, the dust-proof cover being disposed via the aforementioned at least one reflection surface and a gap so that the aforementioned at least one reflection surface is covered.

In addition, it is preferable for the optical path of the light beam, which is incident on the reflecting prism and reflected within the reflecting prism, to be set so that no resonance occurs within the reflecting prism.

The expression "set so that no resonance occurs" means that the relationship between the configuration of the reflecting prism and the position of incidence and angle of incidence of a light beam incident on the reflecting prism is set so that no resonance occurs within the reflecting prism.

Furthermore, in the optical scanner of the present invention it is preferable that the diameter of the light beam at the incidence surface of the reflecting prism (diameter of a point at which the light intensity I of the beam center becomes $1/e^2$ where e is the base of a natural logarithm) ranges from 2 mm to 10 mm.

Moreover, in the optical scanner of the present invention, the scanning optics system may further include a reflecting mirror which reflects the optical beam, reflected (turned back) by the reflecting prism, toward the scan surface.

According to the optical scanner of the present invention, the reflecting prism is used for reflecting the light beam deflected by the deflector, in the opposite direction from the incident direction of the light beam. Therefore, there is no possibility that dust will accumulate on the reflection surface facing a ceiling side. As a result, there is no possibility that the problem of image unevenness, S/N ratio degradation, etc., will arise in readers, etc.

Also, since the reflection surface of the reflecting prism positioned on the ceiling side is protected with a dust-proof cover, the problem of dust accumulating on the outside of this reflection surface and having an adverse influence on total reflection will not occur.

In addition, if the relationship between the configuration of the reflecting prism and the position of incidence and angle of incidence of a light beam incident on the reflecting prism is set so that no resonance occurs within the reflecting prism, the occurrence of noise due to light beam resonance within the reflecting prism can be prevented.

Furthermore, even if microscopic dust adheres to the incidence surface of the reflecting prism, in the case where the diameter of the light beam at the incidence surface of the reflecting prism ranges between 2 mm and 10 mm, the light beam would not be influenced by this dust, and a compact, inexpensive optical scanner can be constructed.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Specific embodiments of an optical scanner of the present invention will hereinafter be described with reference to the drawings.

Figure 1A:
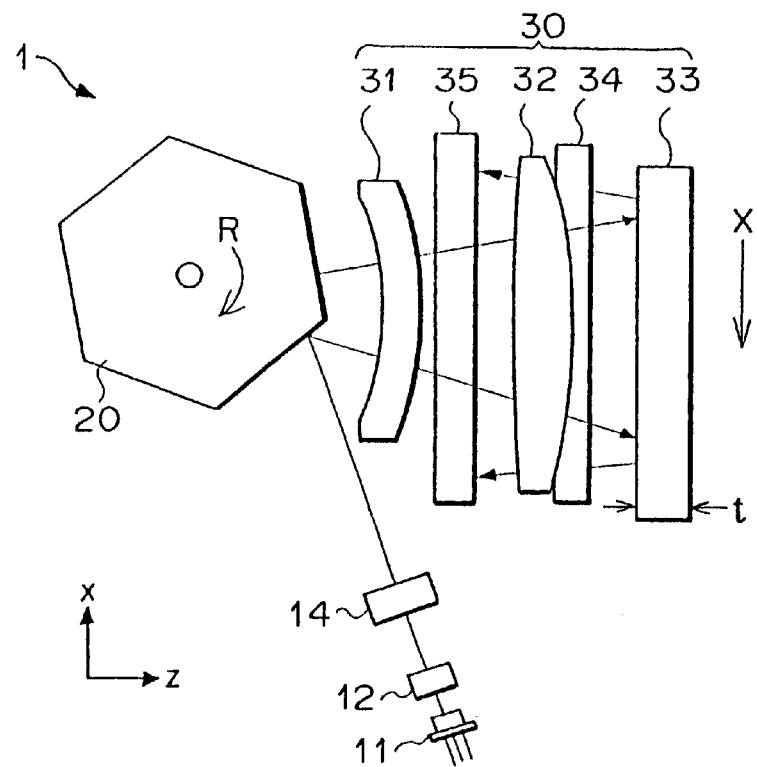
FIG. 1A plan view showing a first embodiment of an optical scanner of the present invention.
Figure 1B:
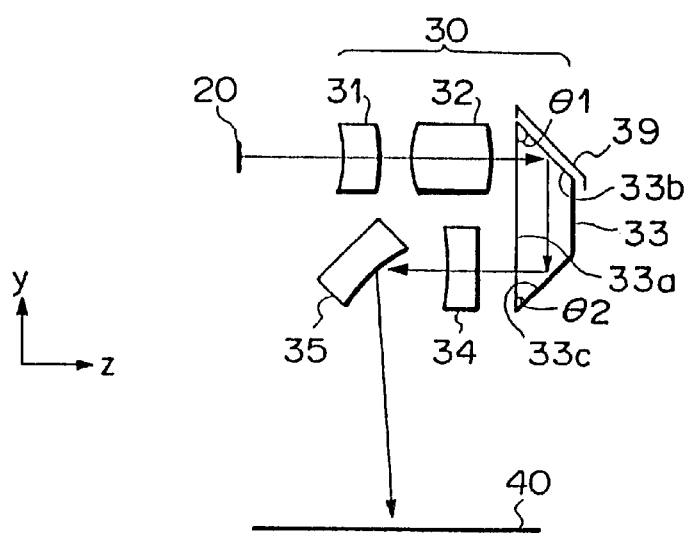
FIG. 1B is a side view showing the scanning optics system of the optical scanner shown in FIG. 1A.

FIG. 1A illustrates a first embodiment of the optical scanner of the present invention, and FIG. 1B illustrates only a scanning optics system disposed behind a polygon mirror. Note that among the x-axis, y-axis, and z-axis perpendicular to one another in FIGS. 1 and 2, the x-axis direction is assumed to be a horizontal-scan direction and the z-axis direction is assumed to be a vertical-scan direction. Also, the xz-plane is referred to as a horizontal-scan section and the yz-plane is referred to as a vertical-scan section.

Referring to FIG. 1, there is shown a first embodiment of the optical scanner of the present invention. The optical scanner 1 comprises (1) a light source 11 for emitting a light beam (laser beam) of wavelength 650 to 670 nm, (2) a collimator lens 12 for collimating the light beam emitted from the light source 11, (3) a polygon mirror 20 as a deflector which has 6 deflection surfaces (reflection surfaces) and also deflects the light beam incident on the deflection surface in the direction of a scanning optics system (image-forming optics system) 30, (4) a cylindrical lens 14 as an incident-light scanning optics system disposed so that the light beam converges with respect to the vertical-scan direction, i.e., so that the collimated light beam passed through the collimator lens 12 is formed as a line image on the deflection surface of the polygon mirror 20, and (5) the scanning optics system 30 for forming the image of the light beam, deflected by the polygon mirror 20, on a predetermined scan surface 40 and also causing the deflected light beam to scan on the scan surface at uniform velocity.

The scanning optics system 30 used in the optical scanner 1 is constructed by a first spherical lens 31, a second spherical lens 32, a trapezoidal reflecting prism 33, a third cylindrical lens 34, and a cylindrical mirror 35, which are disposed in the recited order. The side of the first spherical lens 31 facing the polygon mirror 20 is concave, and the trapezoidal reflecting prism 33 has an incidence surface 33a and two reflection surfaces 33b, 33c and reflects the light beam, incident from the polygon mirror 20 on the incidence surface 33a, in the opposite direction from the incident direction of the light beam. The side of the third cylindrical lens 34 facing the reflecting prism 33 is substantially flat and the opposite side is concave, and the side of the cylindrical mirror 35 facing the third cylindrical lens 34 is concave. The cylindrical mirror 35 serves as a reflecting mirror which reflects the light beam, turned back by the reflecting prism 33 and passed through the cylindrical lens 34, toward the scan surface 40. The upper reflection surface 33b of the reflecting prism 33 facing a ceiling side is protected with a dust-proof cover 39 through the gap between the surface 33b and the cover 39. Note that in FIG. 1B, the lower side on which the third cylindrical lens 34 and the cylindrical mirror 35 are disposed is referred to as the first tier of the scanning optics system 30, and the upper side where the first and second cylindrical lenses 31, 32 are disposed is referred to as the second tier of the scanning optics system 30.

The optical constants of the optical scanner 1 of the above-mentioned construction are listed in Table 1. Note that the angle between the lens axis of the scanning optics system 30 and the light beam incident on the polygon mirror 20 is 79 degrees, the beam scanning angle is ±42 degrees, and the diameter of the light beam on the scan surface 40 is approximately 100 μm in both the horizontal-scan direction and the vertical-scan direction.

TABLE 1

| | | Radius of curvature | Distance | Material |
|---|---|---|---|---|
| 1 | Light source 11, collimator lens 12 | | 30 | |
| 2 | Cylindrical lens 14 | 41.1 | 5 | BK7 |
| 3 | | ∞ | 75.3 | |
| 4 | Polygon mirror 20 | ∞ | 35.2 | |
| 5 | Spherical lens 31 | −130.3 | 15.0 | BK7 |
| 6 | | −105.1 | 20.0 | |
| 7 | Spherical lens 32 | 1491.8 | 24.0 | BK7 |
| 8 | | −190.74 | 7.0 | |
| 9 | Prism 33 | ∞ | 45 | BK7 |
| 10 | | ∞ | 11.0 | |
| 11 | Cylindrical lens 34 | ∞ | 10 | BK7 |
| 12 | | 119.7 | 20.5 | |
| 13 | Cylindrical mirror 35 | −198.5 | 162.8 | |
| 14 | Scan surface 40 | | | |

Note that the radius of curvature is negative when the lens surface is concave with respect to the incident direction of light on the lens surface and is positive when the lens surface is convex.

In order to prevent the occurrence of light resonance within the reflecting prism 33 which causes noise when the light beam is incident substantially perpendicularly to the incidence surface 33a, the sum of the angle θ1 between the incidence surface 33a and the upper reflection surface 33b and the angle θ2 between the incidence surface 33a and the lower reflection surface 33c is set so that it does not become 90 degrees, In this embodiment, one of the two angles θ1 and θ2 is 45 degrees and the other is slightly shifted from 45 degrees.

A description will be given of the operation of the optical scanner 1 of the above-mentioned construction.

The light beam emitted from the light source 11 is collimated by the collimator lens 12 and is formed as a line image on the reflection surface of the polygon mirror 20 by the cylindrical lens 14.

The light beam reflected at the reflection surface of the polygon mirror 20 passes through the first and second spherical lenses 31, 32 disposed in the second tier of the scanning optics system 30 and is incident substantially perpendicularly to the incidence surface 33a of the reflecting prism 33.

The light beam incident within the reflecting prism 33 is totally reflected at the upper reflection surface 33b toward the lower reflection surface 33c. Then, the totally reflected light beam is totally reflected at the lower reflection surface 33c toward the incidence surface 33a and is emitted from the incidence surface 33a in the opposite direction from the incident direction.

The light beam emitted from the incidence surface 33a passes through the cylindrical lens 34 disposed in the first tier of the scanning optics system 30. Then, with the cylindrical mirror 35, the light beam is reflected and directed toward the scan surface 40 disposed in nearly parallel to the xz-plane. The reflected light beam is focused on the scan surface 40 and forms a scanning spot on the scan surface 40.

Since the polygon mirror 20 rotates on its axis at high speeds in the direction of arrow R, the light beam incident on the incidence surface 33a of the reflecting mirror 33 scans repeatedly across the incidence surface 33a in the direction of arrow X. The light beam repeatedly moved in the direction of arrow X scans repeatedly across the scan surface 40 in the depth direction of FIG. 1B, because it is reflected and directed to the scan surface 40 by the cylindrical mirror 35.

As the sum of the angle between the incidence surface 33a and the upper reflection surface 33b and the angle between the incidence surface 33a and the lower reflection surface 33c is set so that no resonance occurs when the light beam is incident substantially perpendicularly with respect to the incidence surface 33a, the problem of the occurrence of noise in an image due to resonance, etc., will not arise.

In addition, since the reflecting prism 33 is used to reflect an incident light beam in the opposite direction from the incident direction, no dust accumulates on the reflection surface 33c facing a ceiling side and there is no possibility that the problem of image unevenness, S/N ratio degradation, etc., will arise. Moreover, because the upper reflection surface 33b of the reflecting prism 33 positioned on the ceiling side is protected with the dust-proof cover 39 disposed via the surface 33b and a gap, the problem of dust accumulating on the outside of this reflection surface 33b and having an adverse influence on total reflection will not occur.

Note that instead of providing the aforementioned dust-proof cover 39, the upper reflection surface 33b may be coated with a deposited film so that the light beam is totally reflected at the surface 33b with reliability.

On the other hand, it is difficult to provide a dust-proof cover for preventing dust adhesion, in the incidence surface 33a on which the light beam is incident. Assuming the size of dust that adhered is a maximum of 200 μm in diameter, the reduction in the light quantity due to dust becomes 1% or greater when the beam diameter ($1/e^2$) is 2 mm or less and results in image unevenness.

Also, if the depth of the reflecting prism 33 is assumed to be 15 mm, the effective height of the incidence surface 33a is about 10 mm and there is a need to reduce the beam diameter to this effective height or less. Conversely, if the beam diameter is to be increased to a value greater than or equal to the effective height, the depth of the reflecting prism 33 has to be increased, and consequently, it will result in an increased cost of the optical system. Therefore, if the beam diameter is in a range of 2 to 10 mm, the reflecting prism 30 of 15 mm in depth can be used and there is no possibility that image unevenness will occur due to dust having a diameter of 200 μm or less. In addition, an optical scanner that is compact and low in cost can be constructed.

Next, a second embodiment of the optical scanner of the present invention will be described with reference to FIG. 2 and Table 2.

Figure 2A:
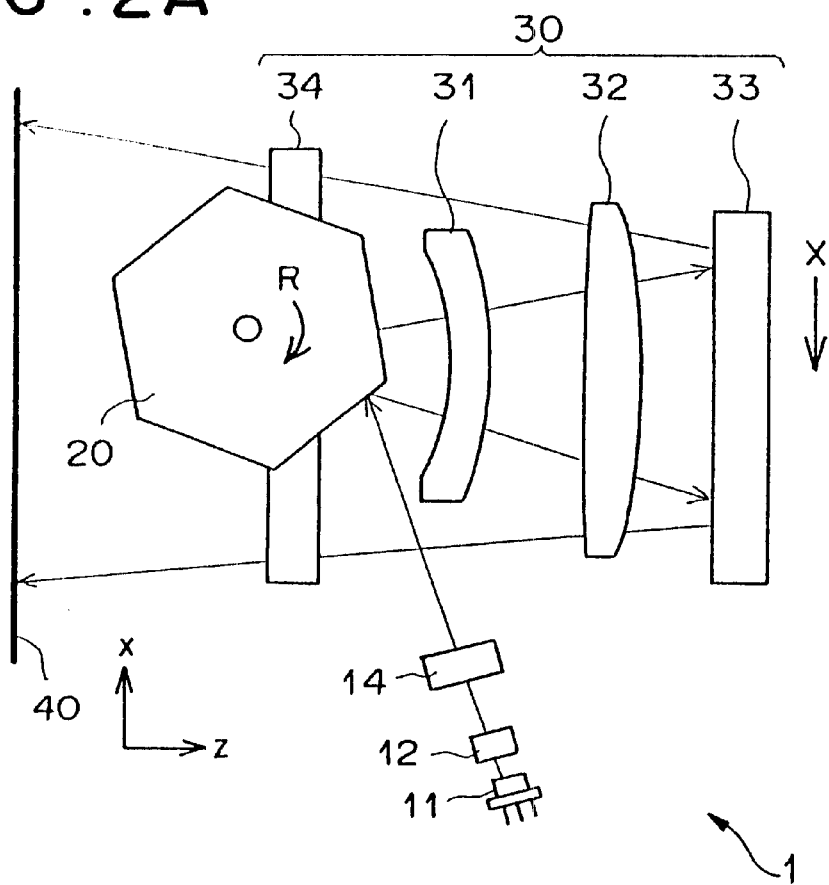
FIG. 2A is a plan view showing a second embodiment of the optical scanner of the present invention.
Figure 2B:
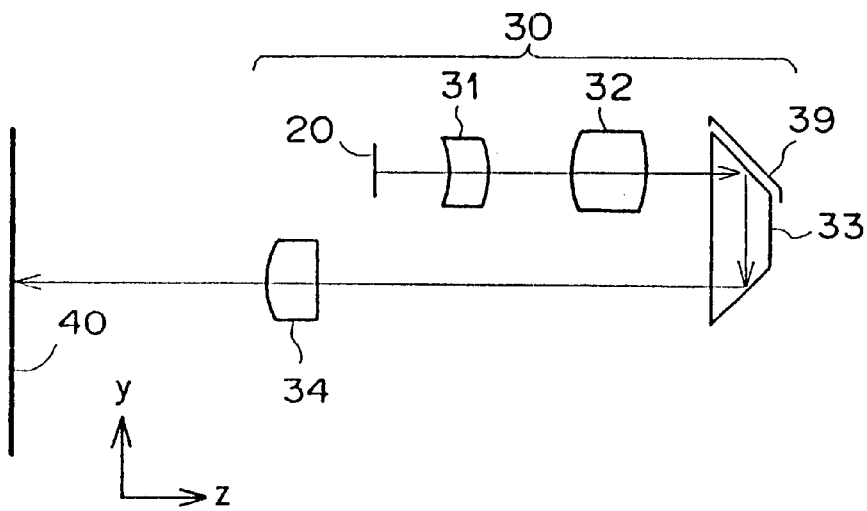
FIG. 2B is a side view showing the scanning optics system of the optical scanner shown in FIG. 2A.

FIG. 2A illustrates the optical scanner 1 of the second embodiment, and FIG. 2B illustrates only a scanning optics system disposed behind a polygon mirror. In FIG. 2, the same reference numerals are applied to the same elements as those in FIG. 1 and a description thereof is omitted unless necessary. The optical constants of the optical scanner 1 of this second embodiment are listed in Table 2.

TABLE 2

|   |   | Radius of curvature | Distance | Material |
|---|---|---|---|---|
| 1 | Light source 11, collimator lens 12 |   | 30 |   |
| 2 | Cylindrical lens 14 | 41.1 | 5 | BK7 |
| 3 |   | ∞ | 75.3 |   |
| 4 | Polygon mirror 20 | ∞ | 35.2 |   |
| 5 | Spherical lens 31 | −130.3 | 15.0 | BK7 |
| 6 |   | −105.1 | 20.0 |   |
| 7 | Spherical lens 32 | 1491.8 | 24.0 | BK7 |
| 8 |   | −190.74 | 7.0 |   |
| 9 | Prism 33 | ∞ | 45 | BK7 |
| 10 |   | ∞ | 111 |   |
| 11 | Cylindrical lens 34 | ∞ | 10 | BK7 |
| 12 |   | −32.0 | 82.5 |   |
| 14 | Scan surface 40 |   |   |   |

Note that the radius of curvature is negative when the lens surface is concave with respect to the incident direction of light on the lens surface and is positive when the lens surface is convex.

The optical scanner 1 of this second embodiment has removed the cylindrical mirror 35, disposed in the optical scanner 1 of the above-mentioned first embodiment, which reflects the optical beam, turned back by the reflecting prism 33 and passed through the cylindrical lens 34, toward the scan surface 40.

The light beam emitted from the incidence surface 33a of a reflecting prism 33 is passed through a cylindrical lens 34 disposed in the first tier of an scanning optics system 30. Next, the reflected light beam is focused on the scan surface 40 disposed in nearly parallel with an xy-plane, and forms a scanning spot on the scan surface 40.

In the optical scanner 1 of this second embodiment, as with the optical scanner 1 of the first embodiment, no dust accumulates on the upper reflection surface 33c facing the ceiling side. Therefore, there is no possibility that the problem of image unevenness, S/N ratio degradation, etc., will arise. In addition, the problem that dust accumulates on the outside of this reflection surface and has an adverse influence 20 on total reflection will not occur, because a reflecting mirror 33 is provided with a dust-proof cover 39.

Next, a third embodiment of the optical scanner of the present invention will be described with reference to FIG. 3 and Table 3.

Figure 3A:
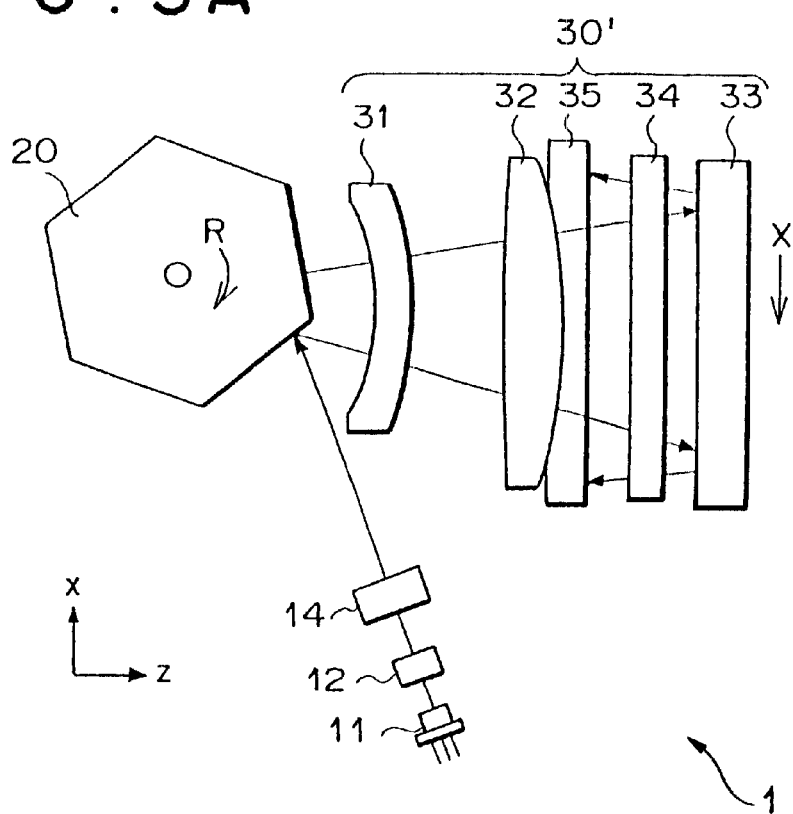
FIG. 3A is a plan view showing a third embodiment of the optical scanner of the present invention.
Figure 3B:
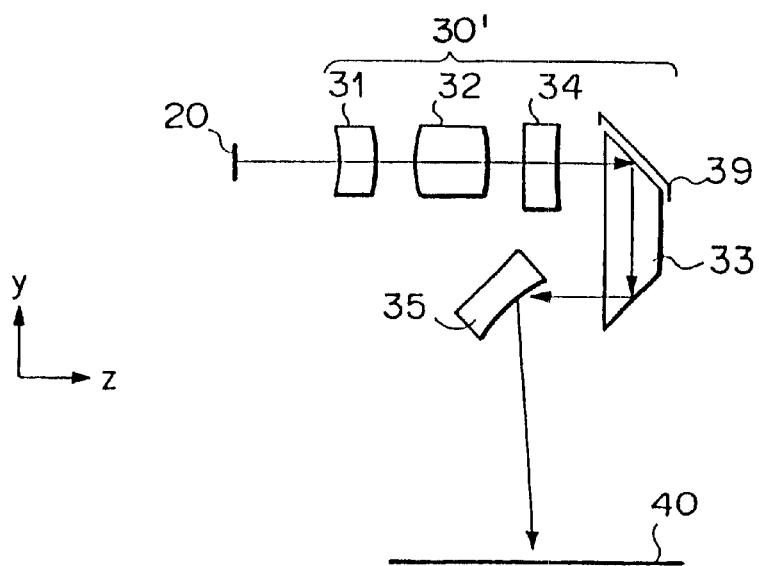
FIG. 3B is a side view showing the scanning optics system of the optical scanner shown in FIG. 3A.
Figure 4:
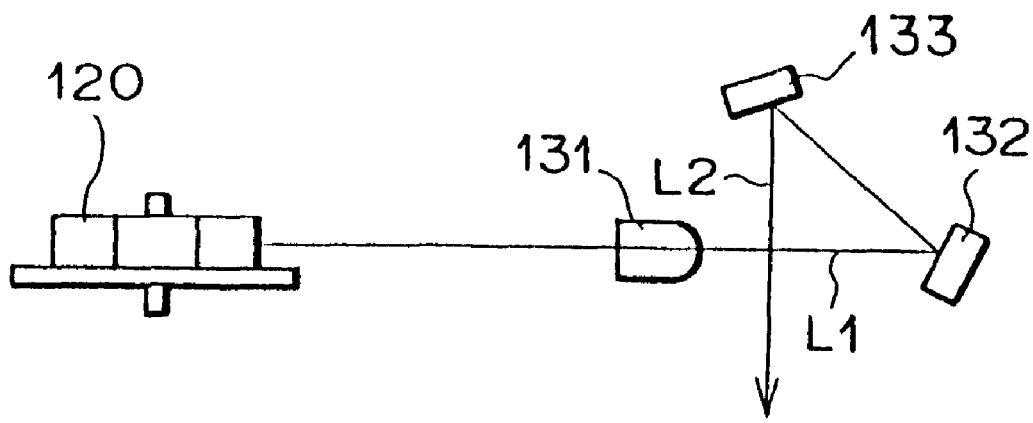
FIG. 4 is a side view showing a conventional optical scanner.

FIG. 3A illustrates the optical scanner 1 of the third embodiment, and FIG. 3B illustrates only a scanning optics system. In FIG. 3, the same reference numerals are applied to the same elements as those in FIG. 1 and a description thereof will not be given unless necessary in particular. The optical constants of the optical scanner 1 of the third embodiment are listed in Table 3.

TABLE 3

| | | Radius of curvature | Distance | Material |
|---|---|---|---|---|
| 1 | Light source 11, collimator lens 12 | | 30 | |
| 2 | Cylindrical lens 14 | 44.7 | 7 | BK7 |
| 3 | | ∞ | 82.3 | |
| 4 | Polygon mirror 20 | ∞ | 36 | |
| 5 | Spherical lens 31 | −97.2 | 12 | BK7 |
| 6 | | −81.3 | 20 | |
| 7 | Spherical lens 32 | 927 | 23 | BK7 |
| 8 | | −217.7 | 10 | |
| 9 | Cylindrical lens 34 | ∞ | 10 | BK7 |
| 10 | | 95.8 | 10 | |
| 11 | Prism 33 | ∞ | 45 | BK7 |
| 12 | | ∞ | 19.3 | |
| 13 | Cylindrical mirror 35 | −204.4 | 161.5 | |
| 14 | Scan surface 40 | | | |

Note that the radius of curvature is negative when the lens surface is concave with respect to the incident direction of light on the lens surface and is positive when the lens surface is convex.

The optical scanner 1 of this third embodiment differs from the optical scanner 1 of the first embodiment in that the cylindrical lens 34, disposed in the first tier of the scanning optics system 30 in the optical scanner 1 of the first embodiment, is disposed in the second tier. In the optical scanner 1 of this third embodiment, the light beam reflected at the reflection surface of the polygon mirror 20 passes through the spherical lenses 31, 32 disposed in the second tier of the scanning optics system 30', further passes through the cylindrical lens 34, and is incident substantially perpendicularly with respect to the incidence surface 33a of the reflecting prism 33.

The light beam incident within the reflecting prism 33 is totally reflected at both the upper reflection surface 33b and the lower reflection surface 33c. Then, the totally reflected light beam is emitted from the incidence surface 33a in the opposite direction from the incident direction. The light beam emitted from the incidence surface 33a is reflected and directed to the scan surface 40 by the cylindrical lens 34 disposed in the second tier of the scanning optics system 30'. Next, the reflected light beam is focused on the scan surface 40 and forms a scanning spot on the scan surface 40.

In the optical scanner 1 of this third embodiment, as with the optical scanner 1 of the first embodiment, no dust accumulates on the upper reflection surface 33c facing the ceiling side. Therefore, there is no possibility that the problem of image unevenness, S/N ratio degradation, etc., will arise. In addition, the problem of dust accumulating on the outside of this reflection surface and having an adverse influence on total reflection will not occur, because a reflecting mirror 33 is provided with the dust-proof cover 39.

While the present invention has been described with reference to the preferred embodiments thereof, the invention is not to be limited to the details given herein, but may be modified within the scope of the appended claims.

In addition, all of the contents of the Japanese Patent Application No. 11(1999)-154512 are incorporated into this specification by reference.

What is claimed is:

1. An optical scanner comprising:
   a light source for emitting a light beam;
   a one-way deflector for deflecting said light beam in one predetermined direction; and
   a scanning optics system for causing the deflected light beam to scan across a scan surface;
   wherein said scanning optics system includes a reflecting prism having at least two reflection surfaces which reflect said light beam, incident from said one-way deflector, in the opposite direction from the incident direction of said light beam.

2. The optical scanner as set forth in claim 1, wherein said reflecting prism has an incidence surface on which said deflected light beam is incident, a first reflection surface to reflect said light beam passed through said incidence surface, and a second reflection surface to reflect said light beam reflected by said first reflection surface toward said incidence surface.

3. The optical scanner as set forth in claim 1, further comprising a dust-proof cover for protecting at least one of said at least two reflection surfaces which is disposed on a ceiling side, said dust-proof cover being disposed proximate said at least one reflection surface via a gap so that said at least one reflection surface is covered.

4. The optical scanner as set forth in claim 2, further comprising a dust-proof cover for protecting at least one of said at least two reflection surfaces which is disposed on a ceiling side, said dust-proof cover being disposed proximate said at least one reflection surface via a gap so that said at least one reflection surface is covered.

5. The optical scanner as set forth in claim 1, wherein an optical path of said light beam, which is incident on said reflecting prism and reflected within said reflecting prism, is set so that no resonance occurs within said reflecting prism.

6. The optical scanner as set forth in claim 2, wherein an optical path of said light beam, which is incident on said reflecting prism and reflected within said reflecting prism, is set so that no resonance occurs within said reflecting prism.

7. The optical scanner as set forth in claim 3, wherein an optical path of said light beam, which is incident on said reflecting prism and reflected within said reflecting prism, is set so that no resonance occurs within said reflecting prism.

8. The optical scanner as set forth in claim 1, wherein the diameter of said light beam at an incidence surface of said reflecting prism ranges from 2 mm to 10 mm.

9. The optical scanner as set forth in claim 2, wherein the diameter of said light beam at the incidence surface of said reflecting prism ranges from 2 mm to 10 mm.

10. The optical scanner as set forth in claim 3, wherein the diameter of said light beam at an incidence surface of said reflecting prism ranges from 2 mm to 10 mm.

11. The optical scanner as set forth in claim 5, wherein the diameter of said light beam at an incidence surface of said reflecting prism ranges from 2 mm to 10 mm.

12. The optical scanner as set forth in claim 1, wherein said scanning optics system further includes a reflecting mirror which reflects the optical beam, reflected by said reflecting prism, toward said scan surface.

13. The optical scanner as set forth in claim 2, wherein said scanning optics system further includes a reflecting mirror which reflects the optical beam, reflected by said reflecting prism, toward said scan surface.

14. The optical scanner as set forth in claim 3, wherein said scanning optics system further includes a reflecting mirror which reflects the optical beam, reflected by said reflecting prism, toward said scan surface.

15. The optical scanner as set forth in claim 5, wherein said scanning optics system further includes a reflecting mirror which reflects the optical beam, reflected by said reflecting prism, toward said scan surface.

16. The optical scanner as set forth in claim 8, wherein said scanning optics system further includes a reflecting mirror which reflects the optical beam, reflected by said reflecting prism, toward said scan surface.

17. An optical scanner comprising:

a light source for emitting a light beam;

a one-way deflector for deflecting said light beam in one predetermined direction; and a scanning optics system for reflecting the deflected light beam from the deflector to a scan surface;

wherein said scanning optics system includes a reflecting prism having at least two reflection surfaces which reflect said light beam, incident from said deflector, in the opposite direction from the incident direction of said light beam;

whereby a non-returning optical path is effected by said scanning optics system being inserted between said deflector and said scan surface.

* * * * *